United States Patent [19]
Gabrielli

[11] Patent Number: 4,609,325
[45] Date of Patent: Sep. 2, 1986

[54] ROBOT WRIST

[75] Inventor: Gino Gabrielli, Paris, France

[73] Assignees: Automobiles Peugeot, Paris; Automobiles Citroen, Neuilly-sur-Seine, both of France

[21] Appl. No.: 684,905

[22] Filed: Dec. 21, 1984

[30] Foreign Application Priority Data

Dec. 23, 1983 [FR] France ............................. 83 20978

[51] Int. Cl.⁴ ............................................. B25J 17/02
[52] U.S. Cl. .................................... 414/755; 403/164; 403/DIG. 1; 414/744 A; 414/751; 901/29; 901/45; 901/48; 384/121
[58] Field of Search .................... 414/730, 735, 744 A, 414/751; 901/27–29, 40, 41, 44, 45, 49, 50; 294/65.5; 403/DIG. 1, 335, 164; 308/10; 269/8; 248/537, 206.5

[56]  References Cited
U.S. PATENT DOCUMENTS

| | | | |
|---|---|---|---|
| 2,678,228 | 5/1954 | Gerhardt | 403/DIG. 1 X |
| 2,912,249 | 11/1959 | Eckold | 403/DIG. 1 X |
| 3,079,191 | 2/1963 | Engelsted et al. | 269/8 X |
| 4,098,001 | 7/1978 | Watson | 901/405 X |
| 4,179,783 | 12/1979 | Inoyama et al. | 29/281.5 |
| 4,337,579 | 7/1982 | DeFazio | 33/169 C |

FOREIGN PATENT DOCUMENTS

| | | |
|---|---|---|
| 1504027 | 12/1967 | France . |
| 2506195 | 11/1982 | France . |
| 0872256 | 10/1981 | U.S.S.R. ............... 901/29 |

Primary Examiner—Donald W. Underwood
Attorney, Agent, or Firm—Karl F. Ross; Herbert Dubno

[57]  ABSTRACT

A robot wrist for introducing a male part into a bore, the end of the part and/or the opening of the bore being chamfered, and which has an arm connected to the robot, an end piece adapted for carrying the part and connecting elements fixed to the arm and the end piece allowing free movement of the end piece with respect to the arm, and ensuring self centering of this end piece. The connecting elements are magnetized in the direction of their axis and are interposed between the arm and the end piece, disposed so as to attract each other mutually and separated from each other by balls.

9 Claims, 2 Drawing Figures

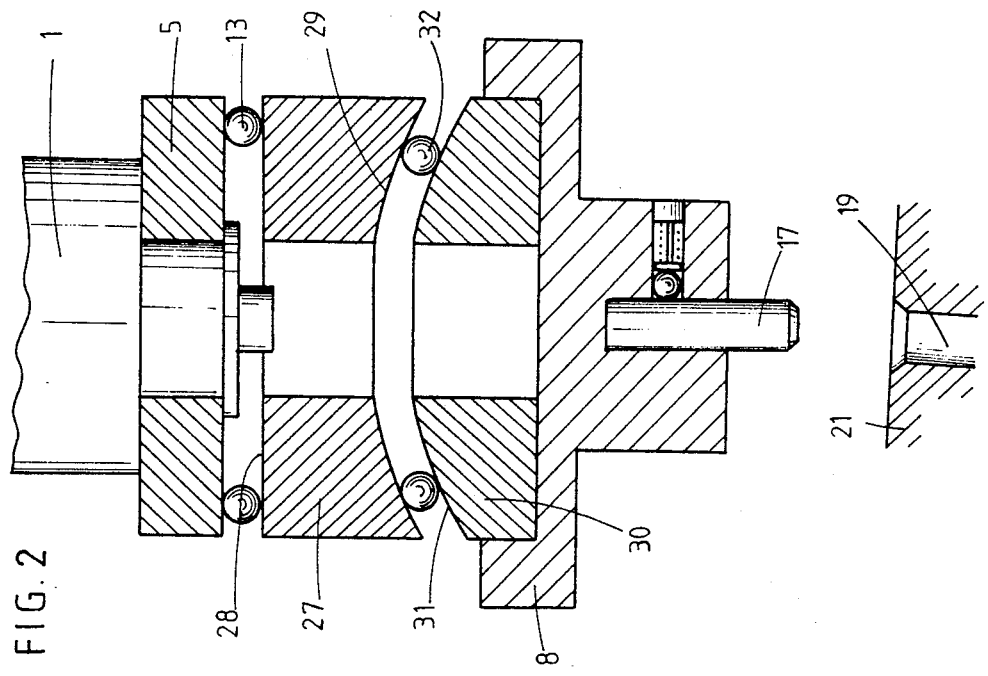
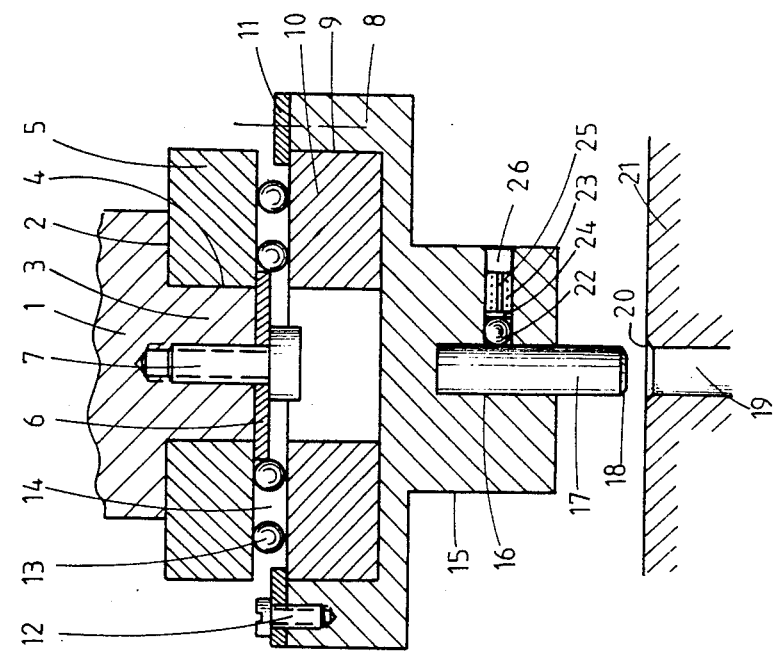

ROBOT WRIST

FIELD OF THE INVENTION

The invention relates to a robot wrist movable so as to bring it to a defined coordinate point at which the axis of the wrist is presented in a direction which is also defined, for example a vertical direction.

BACKGROUND OF THE INVENTION

A robot using a wrist of the aforedescribed type can be used for fitting a male part into a bore, the end of the part and/or the opening of the bore being chamfered so as to facilitate this operation. If the axis of the wrist of the robot coincides perfectly with the axis of the bore, it is sufficient to move the wrist in the direction of this axis for inserting the part into the bore. But, in general, coincidence can only be achieved within the limits of the tolerance of the robot; it may therefore happen that insertion cannot take place. Robot wrists are known which allow a male part to be readily introduced into a bore when the end of the part and/or the opening of the bore are chamfered, and which comprise an arm connected to the robot, an end piece adapted to carry the part, and connecting elements secured to the arm and the end piece which allow free movement of the end piece with respect to the arm and provide self centering of this end piece. Such robots are described more especially in the U.S. Pat. Nos. 4,098,001, 4,337,579, 4,179,783 or in French Pat. No. 2,506,195. But, in these robot wrists, the connection between the arm and the end piece is relatively complicated.

French Pat. No. 1 504 027 further describes a magnetic member formed by two radially magnetized concentric rings separated by an air gap and, on the other hand, a part to be centered which is made from a plastic material and in the mass of which are embedded at least three metal bars or balls. Glass balls may be possibly placed between the member and the part so as to reduce the friction and facilitate centering. For practical reasons this magnetic device cannot be used in known robot wrists.

SUMMARY OF THE INVENTION

The present invention provides a robot wrist of the above type, in which the connecting means comprise two elements magnetized in the direction of their axes, which are interposed between the arm and the end piece, and disposed so as to attract each other mutually while being separated from each other by balls.

The balls are preferably magnetized. They thus provide a double function. In the presence of a lateral force exerted on the end piece, they allow freedom of movement; in the absence of a lateral force, they transmit the magnetic flux and ensure centering by dividing themselves homogeneously between the two magnetized faces.

The faces opposite the magnetized elements may be flat, the elements being secured respectively to the arms and the end piece. The end piece may be thus moved parallel to itself, in any direction, while having two degrees of freedom. The faces opposite the magnetized elements may also be spherical, one concave and the other convex, the elements being respectively fixed to the arm and the end piece. The end piece may thus turn in any direction with respect to the arm.

In a particular embodiment of the invention, the connecting means comprise three different elements magnetized in the direction of their respective axes axis, which are superimposed and separated from each other by balls, one of the endmost elements being secured to the arm whereas the other is secured to the end piece, the central end piece having a flat face opposite a flat face of one of the endmost elements and a spherical face, concave or convex, opposite a complementary spherical face, respectively convex or concave, of the other endmost element. The end piece thus has four degrees of freedom with respect to the arm.

The faces opposite the magnetized elements preferably have the same cross section. These elements then, under the effect of the magnetic forces, tend to position themselves exactly opposite each other thus ensuring self centering of the end piece with respect to the arm.

BRIEF DESCRIPTION OF THE DRAWING

Two embodiments of a robot wrist according to the invention will be described hereafter by way of non limitative examples with reference to the accompanying drawing in which:

FIG. 1 is diagrammatic axial section of a wrist providing 25 planar movement, with two degrees of freedom; and FIG. 2 is diagrammatic axial section of a wrist providing both planar movement and angular movement, the assembly having four degrees of freedom.

SPECIFIC DESCRIPTION

As can be seen from FIG. 1, the robot wrist can comprise an arm 1 which has a shoulder 2 and an end part 3 of smaller diameter than that of the shoulder; this end part is engaged in the bore 4 of a flat disk 5 which is magnetized in the direction of the axis of the arm 1 and of the disk 5, that is to say that its magnetized faces are its faces perpendicular to this axis. The disk is held against shoulder 2 by a non magnetic washer 6 fixed by a screw 7 to the end face of end part 3.

Juxtaposed with the magnetized disk 5 is a magnetized annular disk 10 which is received in an axially open compartment or recess 9 in an end piece 8 of a body receiving the part 17 to be inserted into a bore 19. The disk 10 is held in the recess with its upper surface of end piece 8 by a nonmagnetic washer 11 fixed by screws 12 to the end face of end piece 8.

End piece 8 is disposed so that the two disks 5 and 10 are confronting each other; these disks are fixed so that their facing faces have opposite polarities and thus tend to attract each other mutually. They are held separated from each other by metal balls 13 which are inserted therebetween while allowing small movements of end piece 8 parallel to itself with respect to arm 1. Washers 6 and 11 serve as inner and outer stops for these balls and prevent them from escaping.

The mutual attraction of the two disks 5 and 10 and the transmission of the magnetic flux by balls 13 provide homogeneous self centering of the balls in the separation gap 14. End piece 8 has, at its end opposite disk 5, a reduced diameter part 15 having an axial bore 16. In this bore may be fitted the part 17, which can be for example cylindrical, whose end has a chamfer 18 and which is intended to be inserted in the bore 19, also chamfered at its mouth 20, of a fixed part 21.

Part 17 may be held in the end piece by means of a presser ball or roller 22 on which a spring 23 may exert a thrust through a washer 24. This latter is fixed to an axial pulling rod 25 controlled by an electromagnet 26.

The magnetization of disks 5 and 10 is such that the force of attraction is greater than the weight of end piece 8 carrying part 17.

When part 17 is engaged in the chamfer of bore 19 and when the wrist is moved vertically so as to insert this part 17 in to the bore, the transverse force exerted by chamfer 18 causes a movement of the end piece with balls 13 rolling against the facing faces of disks 5 and 10. After insertion of part 17, the electromagnet 26 is actuated so that the presser washer 24 moves away from the ball or roller 22, the part thus being released from bore 16. As soon as the arm has drawn back, part 17 is withdrawn, the transverse force exerted on the end piece disappears and this end piece is automatically recentered under the effect of the attraction of the two disks.

In the embodiment shown in FIG. 2, there is again the arm 1 to which the magnetized disk 5 is fixed. But opposite this disks, there is provided a magnetized part 27 which has a flat circular face 28 turned towards disk 5, and having the same cross section as this disk. Balls 13 are inserted between this flat face of the disk, and a concave spherical face 29. The wrist further comprises another magnetized part 30, fixed in end piece 8 and having a convex spherical face 31 disposed opposite the spherical face 29 of part 27, these two faces having the same cross section and having opposite polarities. The two faces 29 of the part have the same center situated in the vicinity of the end of part 17 to be introduced into the bare 19. Metal balls 32 are interposed between the two faces 29 and 31. Washers similar to washers 6 and 11 and not shown in the drawing prevent balls 13 and 32 from escaping.

Part 17 may thus move parallel to itself with respect to arm 1 in any direction whereas end piece 8 may pivot in any direction with respect to part 27. Thus it can be seen that it is possible to correct a positioning fault with two degrees of freedom and an orientation fault also with two degrees of freedom.

What is claimed is:

1. In a robot arm, wrist and end part arrangement for introducing a male part into a bore, the end of the part and/or the opening of the bore being chamfered, which comprises:
    an arm;
    an end piece adapted for carrying the male part; and
    connecting elements fixed to the arm and the end piece allowing free movement of the end piece with respect to the arm and ensuring self centering of said end piece, said connecting means comprising:
    two elements having axes and magnetized in the direction of their axes, which are interposed between the arm and the end piece and disposed so as to attract each other mutually; and
    a plurality of balls interposed between and separating said elements from each other.

2. The robot arm, wrist and end part arrangement as claimed in claim 1 wherein said balls are metal balls.

3. The robot arm, wrist and end part arrangement as claimed in claim 1 wherein said elements have confronting faces which are flat, said elements being fixed respectively to the arm and to the end piece.

4. The robot arm, wrist and end part arrangement as claimed in claim 1 wherein said elements have confronting faces which are spherical, one concave and the other convex, said elements being fixed respectively to the arm and to the end piece.

5. The robot arm, wrist and end part arrangement as claimed in claim 1, wherein said connecting means comprise three elements magnetized in the direction of their respective axis, which are superimposed and separated from each other by balls, a first endmost one of said elements being fixed to said arm whereas a second endmost one of said elements is fixed to said end piece, a central one of said elements having a flat face opposite a flat face of one of the endmost elements and a spherical face, concave or convex, opposite a spherical face, respectively convex or concave, of the other endmost element.

6. The robot arm, wrist and end part arrangement as claimed in claim 1 wherein confronting faces of said magnetized elements have the same cross section.

7. The robot arm, wrist and end part arrangement as claimed in claim 1 wherein one of said magnetized elements comprises a bore in which is engaged one end of said arm and is held in place by a nonmagnetic washer which forms an inner stop for said balls.

8. The robot arm, wrist and end part arrangement as claimed in claim 1 wherein one of said magnetized elements is engaged in a recess in the end piece and is held in place by a nonmagnetic washer which forms an outer stop for said balls.

9. The robot arm, wrist and end part arrangement as claimed in claim 1 wherein said end piece comprises means for holding said part in position and adapted for releasing said male part on a command when it is engaged in its bore.

* * * * *